US009298221B2

(12) United States Patent
Choi et al.

(10) Patent No.: US 9,298,221 B2
(45) Date of Patent: Mar. 29, 2016

(54) METHOD OF DISPLAYING FOLDING INFORMATION AND FOLDABLE DISPLAY APPARATUS USING THE METHOD

(71) Applicant: SAMSUNG DISPLAY CO., LTD., Yongin, Gyeonggi-Do (KR)

(72) Inventors: Dong-Wook Choi, Yongin (KR); Byeong-Hwa Choi, Yongin (KR); Sung-Su Hong, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 37 days.

(21) Appl. No.: 14/263,327

(22) Filed: Apr. 28, 2014

(65) Prior Publication Data

US 2015/0185787 A1     Jul. 2, 2015

(30) Foreign Application Priority Data

Dec. 30, 2013    (KR) .................... 10-2013-0167012

(51) Int. Cl.
 G06F 1/16    (2006.01)
(52) U.S. Cl.
 CPC ............ G06F 1/1677 (2013.01); G06F 1/1616 (2013.01); G06F 1/1652 (2013.01)

(58) Field of Classification Search
 CPC ... G06F 1/1677; G06F 1/1616; G06F 1/1652; G06F 3/0412; G06F 2203/04102
 See application file for complete search history.

(56) References Cited

U.S. PATENT DOCUMENTS

| | | | |
|---|---|---|---|
| 2002/0037754 A1* | 3/2002 | Hama et al. | 455/566 |
| 2007/0085845 A1 | 4/2007 | Kikuchi et al. | |
| 2009/0219247 A1* | 9/2009 | Watanabe et al. | 345/157 |
| 2010/0053073 A1* | 3/2010 | Cohen et al. | 345/156 |
| 2012/0038613 A1* | 2/2012 | Choi | 345/211 |
| 2012/0329528 A1 | 12/2012 | Song | |
| 2013/0127606 A1 | 5/2013 | Chang | |
| 2013/0154970 A1 | 6/2013 | Seo et al. | |

FOREIGN PATENT DOCUMENTS

| | | |
|---|---|---|
| JP | 2013-105311 | 5/2013 |
| JP | 2013-105312 | 5/2013 |
| KR | 1020100103095 | 9/2010 |
| KR | 1020130085528 | 7/2013 |

* cited by examiner

Primary Examiner — Mark Regn
(74) Attorney, Agent, or Firm — F. Chau & Associates, LLC (57) ABSTRACT

A method of displaying folding information includes evaluating a folded state of a foldable display apparatus, measuring a folding accumulation time that indicates an amount of time that the folded state is maintained, determining the folding information based on the folding accumulation time, and displaying the folding information on a display panel of the foldable display apparatus.

19 Claims, 10 Drawing Sheets

METHOD OF DISPLAYING FOLDING INFORMATION AND FOLDABLE DISPLAY APPARATUS USING THE METHOD

CROSS-REFERENCE TO RELATED APPLICATIONS

This application claims priority under 35 U.S.C. §119 to Korean Patent Application No. 10-2013-0167012, filed on Dec. 30, 2013, the disclosure of which is incorporated by reference herein in its entirety.

TECHNICAL FIELD

Exemplary embodiments of the present invention relate to a method of displaying folding information and a foldable display apparatus using the method.

DISCUSSION OF THE RELATED ART

Various types of display apparatuses such as, for example, flexible display apparatuses, rollable display apparatuses, and foldable display apparatuses have been developed.

Such display apparatuses may be manufactured using plastic substrates to form display panels. The flexibility of the display panels may be increased by reducing the thickness thereof. In this case, the display panels may eventually become deformed due to their flexibility.

SUMMARY

Exemplary embodiments of the present invention include a method for displaying folding information and a foldable display apparatus using the method.

According to an exemplary embodiment of the present invention, a method of displaying folding information includes evaluating a folded state of a foldable display apparatus, measuring a folding accumulation time when the folded state is maintained, determining the folding information based on the folding accumulation time, and displaying the folding information on a display panel of the foldable display apparatus.

Evaluating the folded state may be performed based on strain values of a folding area at which the foldable display apparatus is folded.

The method may further include evaluating an unfolded state of the foldable display apparatus, and measuring an unfolding accumulation time when the unfolded state is maintained. The folding information may be determined based on the folding accumulation time and the unfolding accumulation time.

The folding information may indicate a value obtained by subtracting the unfolding accumulation time from the folding accumulation time, and may be displayed using a combination of numbers, colors, and bar lengths.

The folded state may include a front folded state or a back folded state. The folding accumulation time may be classified into a front folding accumulation time and a back folding accumulation time according to the folded state. The folding information may be determined based on the front folded accumulation time and the back folded accumulation time.

A portion of the display panel of the foldable display apparatus may be folded.

According to an exemplary embodiment of the present invention, a foldable display apparatus includes a display panel including a folding area at which a display panel is folded, a sensing unit for determining a folded state of the display panel, a time measurement unit for measuring a folding accumulation time when the folded state is maintained, a folding information determination unit for determining folding information based on the folding accumulation time, and a storage unit for storing the folding information.

The foldable display apparatus may further include a folding information display unit for displaying the folding information on the display panel.

The sensing unit may include at least one strain sensor. The at least one strain sensor may be located in the folding area, and when strain values of the folding area are measured and the strain values are in a predetermined range, the at least one strain sensor may determine that the foldable display apparatus is in the folding state.

The folded state may be determined based on an average value of the strain values measured by the at least one strain sensor.

The time measurement unit may measure an unfolding accumulation time when an unfolded state of the display panel is maintained, and the folding information may be determined based on the folding accumulation time and the unfolding accumulation time.

The folding information may indicate a value obtained by subtracting the unfolding accumulation time from the folding accumulation time, and may be displayed using a combination of numbers, colors, and bar lengths.

The folded state may include a front folded state or a back folded state. The folding accumulation time may be classified into a front folding accumulation time and a back folding accumulation time according to the folded state. The folding information may be determined based on the front folding accumulation time and the back folding accumulation time.

According to an exemplary embodiment of the present invention, a method of providing folding information includes evaluating a folded state of a foldable display apparatus, wherein the folded state is a state in which a display panel of the foldable display apparatus is not substantially flat, measuring a folding accumulation time that indicates an amount of time that the folded state is maintained, determining the folding information based on the folding accumulation time, and providing the folding information to a user.

The folding information may be provided to the user via a visual indication, an audible indication, or a vibratory indication.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Exemplary embodiments of the present invention will be described more fully hereinafter with reference to the accompanying drawings. Like reference numerals may refer to like elements throughout the accompanying drawings.

It will be understood that although the terms 'first' and 'second' are used herein to describe various elements, these elements should not be limited by these terms.

In the drawings, the sizes and thicknesses of layers and regions may be exaggerated for convenience of explanation, and thus, the sizes and thicknesses are not limited to those shown in the drawings.

Figure 1A:
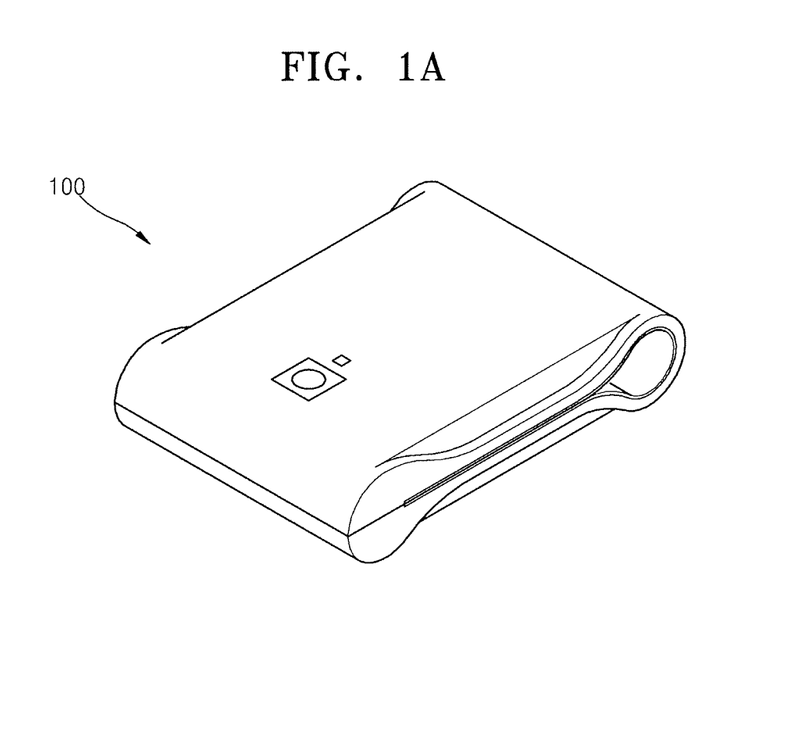
FIGS. 1A to 1C are schematic views of a foldable display apparatus in folded or unfolded states, according to exemplary embodiments of the present invention.
Figure 1B:
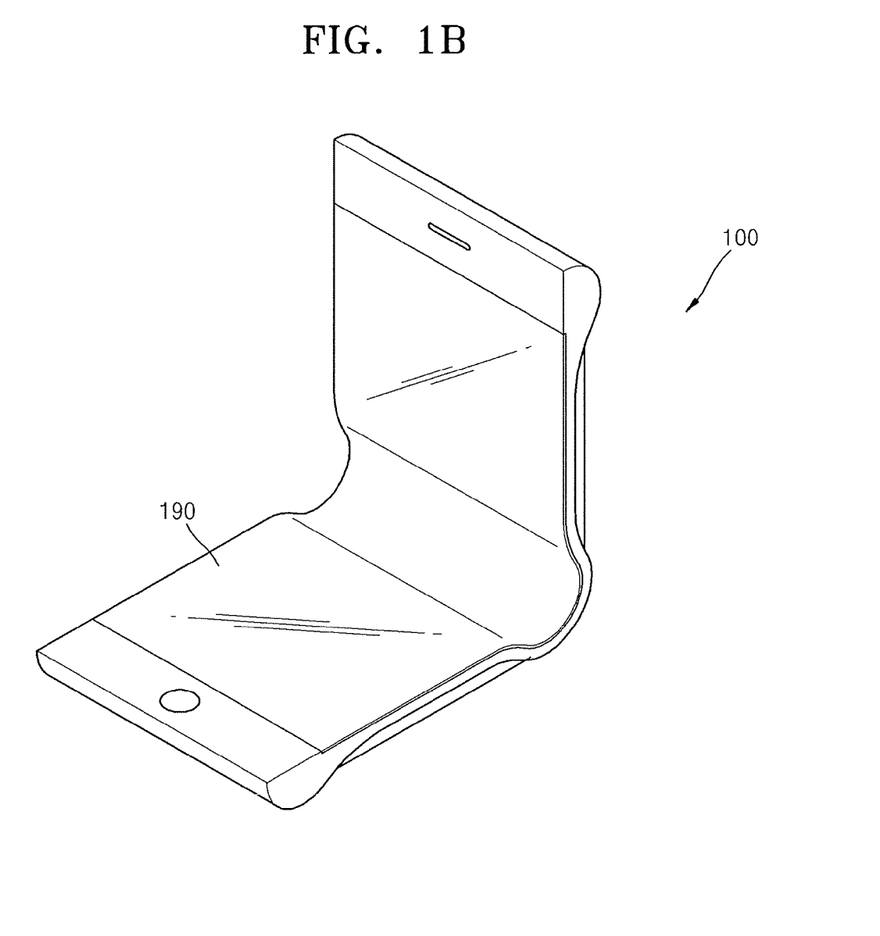
Figure 1C:
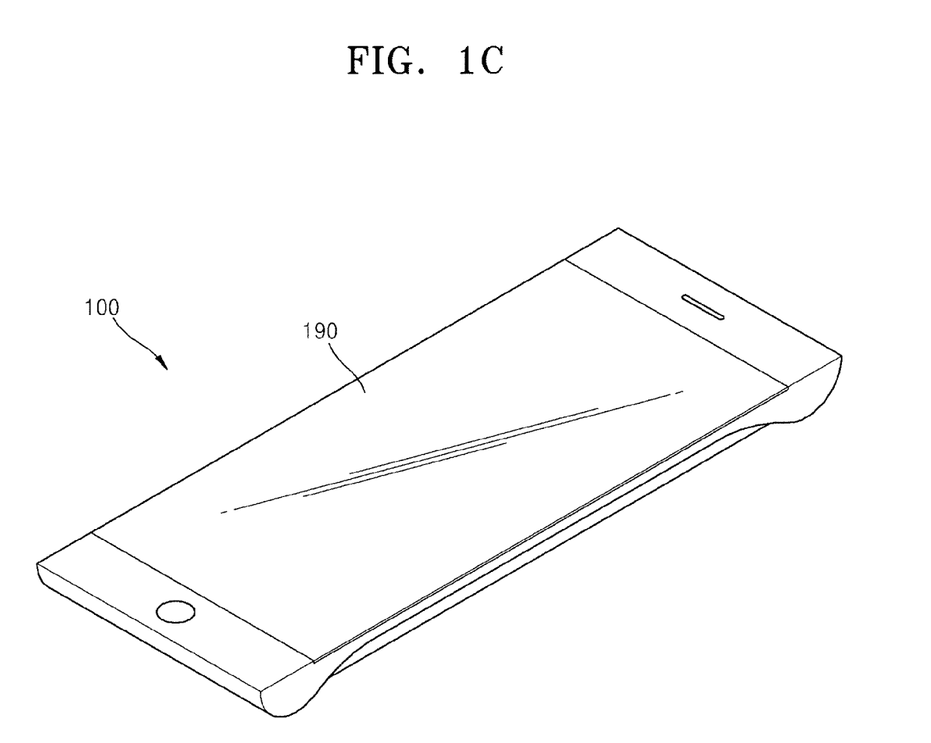

FIG. 1A to 1C are schematic views of a foldable display apparatus 100 in folded and unfolded states, according to exemplary embodiments of the present invention.

FIG. 1A shows the foldable display apparatus 100 in a folded state, FIG. 1B shows the folding display apparatus 100 transitioning between the folded state and an unfolded state, and FIG. 1C shows the foldable display apparatus 100 in the unfolded state.

The foldable display apparatus 100 includes a display panel 190 that is foldable. The display panel 190 displays images including, for example, text, video, pictures, two-dimensional (2D) images, three-dimensional (3D) images, icons, cursors, etc., which are processed in the foldable display apparatus 100. For example, when the foldable display apparatus 100 is a portable computer, the foldable display apparatus 100 may display a user interface (UI), a graphical user interface (GUI), etc.

Since the display panel 190 may be folded, a form thereof may be changed according to a particular use. As a result, the foldable display apparatus 100 may be conveniently carried and stored. In addition, the foldable display apparatus 100 may display an image while in the folded state and the unfolded state.

At least one portion of the foldable display apparatus 100 may be flexible, and the foldable display apparatus 100 may be folded at one or more locations. Folding may refer to a state in which a shape of the foldable display apparatus 100 is at least partially deformed (e.g., not substantially flat). In exemplary embodiments, some parts of the foldable display apparatus 100 may be folded, and other parts thereof may not be folded. However, exemplary embodiments of the present invention are not limited thereto. In exemplary embodiments, all parts of the foldable display apparatus 100 may be flexible. Thus, a deformation degree of the foldable display apparatus 100 may vary according to exemplary embodiments.

The display panel 190 may include a flexible substrate formed of, for example, a foldable plastic material(s) or a metal foil(s), pixel units formed on the substrate, and a passivation film. The display panel 190 may be, for example, an organic light-emitting display apparatus, a liquid crystal display apparatus, an electrophoretic display apparatus, etc.

While in the folded state, various strains may act on the foldable display apparatus 100 in the folded parts. Further, when the foldable display apparatus 100 is in the folded state for a long period of time, the strains may accumulate, and thus, the foldable display apparatus 100 may become deformed, or imperfections (e.g., curves) may be formed thereon. The amount of accumulated strains may be in inverse proportion to a lifetime of a product. A method of relieving strains that result from the foldable display apparatus 100 being in the folded state is to leave the foldable display apparatus 100 in an unfolded state. Therefore, the ability of providing information to a user in both the folded and unfolded states of the foldable display apparatus 100 may be helpful in relieving the strains on the foldable display apparatus 100.

Figure 2A:
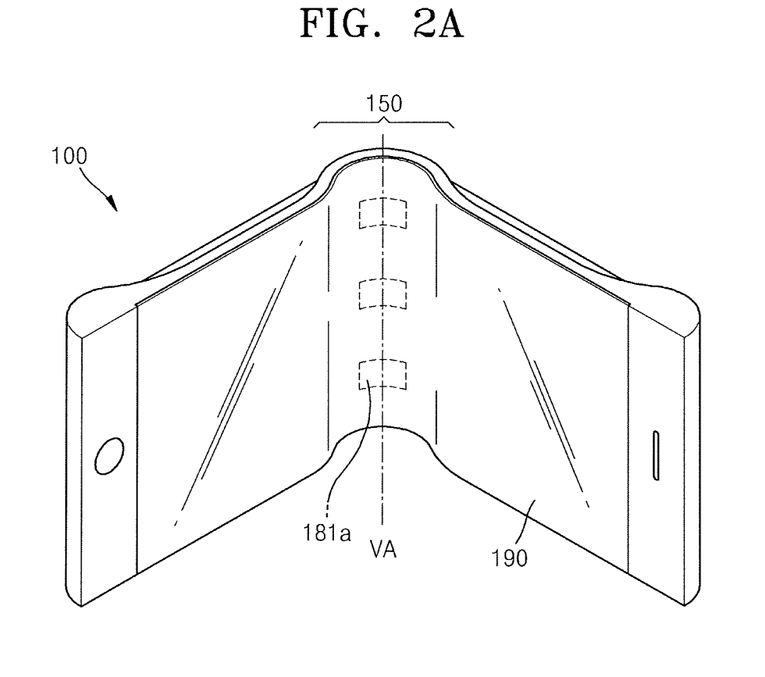
FIGS. 2A and 2B are schematic views of a foldable display apparatus in which a front portion and a back portion is folded, according to exemplary embodiments of the present invention.
Figure 2B:
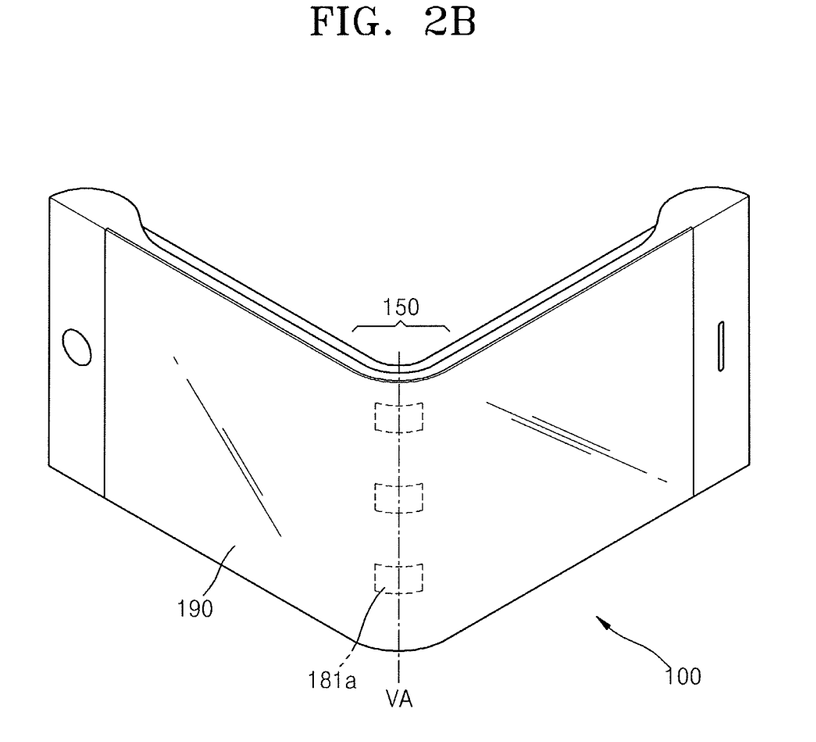

FIGS. 2A and 2B are schematic views of the foldable display apparatus 100 in which a front portion and a back portion is folded, according to exemplary embodiments of the present invention.

The front portion or the back portion of the foldable display apparatus 100 may be folded along a virtual axis VA. At least one sensor 181a may be placed in a folding part 150 at which the foldable display apparatus 100 is folded. The sensor 181a is a sensor capable of detecting strain (e.g., a strain sensor). For example, the sensor 181a may sense values of strains resulting from the deformation of the folding part 150. In this case, the values of strains may be, for example, an average value of the values sensed from the at least one sensor 181a. Thus, the at least one sensor 181a may be used to detect varying degrees of strains occurring at the folding part 150 of the foldable display apparatus 100.

As illustrated in FIG. 2A, the front portion of the display panel 190 of the foldable display apparatus 100 is folded along the virtual axis VA. As illustrated in FIG. 2B, the back portion of the display panel 190 of the foldable display apparatus 100 is folded along the virtual axis VA.

When the front portion of the display panel 190 is folded, a top portion of a folded area is compressed, and a bottom portion thereof is extended. That is, a front surface of the display panel 190 (e.g., a display area) is folded, and a rear surface of the display panel 190 is extended, as shown in FIG. 2A. When the back portion of the display panel 190 is folded, the top portion of the folded area is extended, and the bottom portion thereof is compressed. That is, the front surface of the display panel 190 (e.g., the display area) is extended, and the rear surface of the display panel 190 is compressed, as shown in FIG. 2B. The folded state may correspond to the front folded state or the back folded state, the folding accumulation time may be classified into a front folding accumulation time and a back folding accumulation time according to the folded state, the folding information may be determined based on the front folding accumulation time and the back folding accumulation time, the front folded state may correspond to the foldable display apparatus 100 being folded in a first direction, and the back folded state may correspond to the foldable display apparatus 100 being folded in a second direction, opposite the first direction. During front folding and back folding, opposite pressures are applied to the front and back portions. Thus, by using the strain values, front and back folded states may be evaluated. Further, the strains resulting from the front folded state may be relieved by placing the foldable display apparatus 100 in the back folded state, and vice versa.

Hereinafter, the term "folded state" may denote both the front folded state as shown in FIG. 2A, and the back folded state as shown in FIG. 2B.

Figure 3:
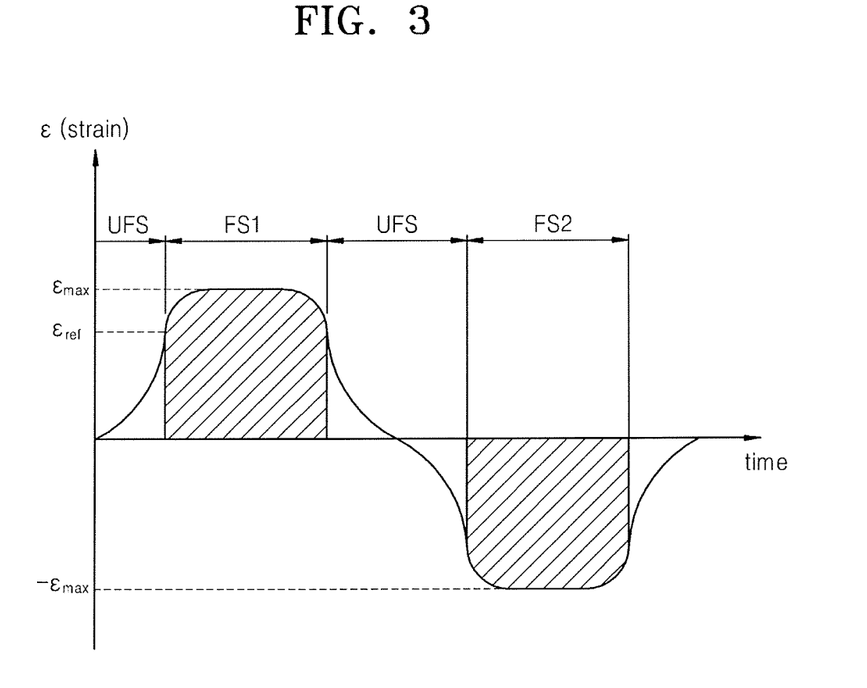
FIG. 3 is a graph illustrating strain values according to folded and unfolded states of a foldable display apparatus.

FIG. 3 is a graph illustrating strain values according to folded and unfolded states of the foldable display apparatus 100. In FIG. 3, the x-axis indicates time, and the y-axis indicates the amount of strain. The folded state may include the front folded state and the back folded state.

Referring to FIG. 3, the strain values change as the folded state of the foldable display apparatus 100 changes to an unfolded state UFS, a first folded state FS1, the unfolded state UFS, a second folded state FS2, and the unfolded state UFS in this order.

As the state of the foldable display apparatus 100 changes from the unfolded state UFS to the first folded state FS1, the strains in the folding area increase. When the foldable display apparatus 100 is completely folded, the strains in the folding area have maximum values. While the foldable display apparatus 100 is in the first folded state FS1, the strains accumulate over time. When the amount of the accumulated strains is about equal to or greater than a certain degree, the accumulated strains may result in deformation or imperfections (e.g., curves) of the foldable display apparatus 100.

When the state of the foldable display apparatus 100 changes from the first folded state FS1 to the unfolded state UFS, the strains applied to the foldable display apparatus 100 may be relieved.

When the state of the foldable display apparatus 100 changes from the unfolded state UFS to the second folded state FS2, the strains may act in a reverse direction. The strains acting in the reverse direction may be relieved in the first folded state FS1.

The first folded state FS1 may indicate the front folded state, and the second folded state FS2 may indicate the back folded state. Alternatively, the first folded state FS1 may indicate the back folded state, and the second folded state FS2 may indicate the front folded state.

By providing folding information based on the folded and unfolded states of the foldable display apparatus 100, deformation of the foldable display apparatus 100 may be prevented or reduced as a user of the foldable display apparatus 100 is informed of the amount of accumulated strains. That is, according to exemplary embodiments of the present invention, folding information is provided to the user, allowing the user to take action in response to the folding information to prevent or reduce strains from occurring. Folding information may be provided to the user in a variety of ways including, for example, via a visual indication (e.g., via the display panel 190), an audible indication (e.g., via generating and outputting a sound), or a vibratory indication (e.g., via generating and outputting a vibration).

The folded state may be defined based on a maximum strain value $\epsilon_{max}$ occurring in the folded area. For example, the first folded state FS1 may be defined as a case in which a strain value $\epsilon$ of the folded area is in a range of $\epsilon_{ref} \leq \epsilon \leq \epsilon_{max}$ ($\epsilon_{ref} = a * \epsilon_{max}$, and a is between 0.5 and 1). The second folded state FS2 may be defined as a case in which a strain value $\epsilon$ of the folded area is in a range of $-\epsilon_{ref} \leq \epsilon \leq \epsilon_{max}$ ($\epsilon_{ref} = a * \epsilon_{max}$, and a is between 0.5 and 1).

Hereinafter, the structure of the foldable display apparatus 100 according to an exemplary embodiment of the present invention is described in detail with reference to FIG. 4.

Figure 4:
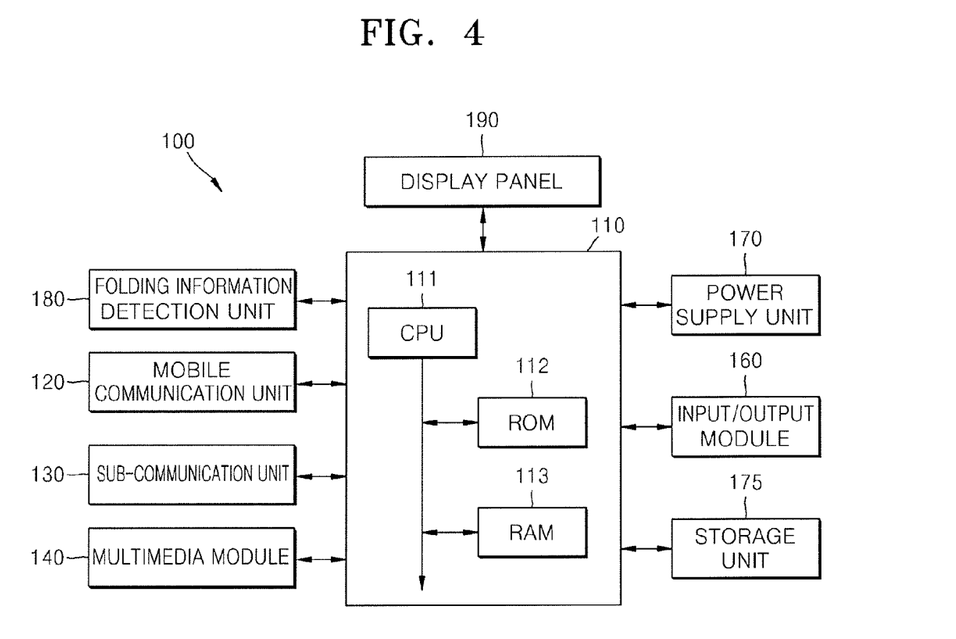
FIG. 4 is a block diagram of a foldable display apparatus, according to an exemplary embodiment of the present invention.

FIG. 4 is a block diagram of the foldable display apparatus 100 according to an exemplary embodiment of the present invention. The foldable display apparatus 100 is not limited to the components shown in FIG. 4, and may include less or more components than shown in FIG. 4.

The foldable display apparatus 100 may be connected to an external device using a mobile communication unit 120 (e.g., a mobile communication circuit), a sub-communication unit 130 (e.g., a sub-communication circuit), and a connector. The external device may be, for example, a mobile phone, a smartphone, a tablet computer, a server, etc.

Referring to FIG. 4, the foldable display apparatus 100 may include the display panel 190 and a folding information detection unit 180.

In addition, the foldable display apparatus 100 may include a control unit 110 (e.g., a control circuit), the mobile communication unit 120, the sub-communication unit 130, a multimedia module 140, an input/output module 160, a storage unit 175, and a power supply unit 170.

The control unit 110 may include a central processing unit (CPU) 111, a read-only memory (ROM) 112 in which a control program for controlling the foldable display apparatus 100 is stored, and a random-access memory (RAM) 113 in which signals or data received from outside of the foldable display apparatus 100 are stored, or which is used as a storage area for operations performed in the foldable display apparatus 100. The CPU 111 may include a plurality of processors such as, for example, a single-core processor, a dual-core processor, a triple-core processor, or a quad-core processor. The CPU 111, the ROM 112, and the RAM 113 may be interconnected by an internal bus.

The control unit 110 may control the mobile communication unit 120, the sub-communication unit 130, the multimedia module 140, the input/output module 160, the storage unit 175, the power supply unit 170, and the display panel 190.

The control unit 110 may control the display panel 190 to display the folding information received from the folding information detection unit 180 (e.g., a folding information detection circuit) on the display panel 190 of the foldable display apparatus 100. In exemplary embodiments, the control unit 110 may control a method of providing the folding information to the user using different methods (e.g., via sound or vibration).

The mobile communication unit 120 may connect the foldable display apparatus 100 to the external device using, for example, one or more antennas under the control of the control unit 110.

The sub-communication unit 130 may include at least one of, for example, a wireless LAN module and a short distance communication module (e.g., a Bluetooth module or a Near Field Communication (NFC) module), and the multimedia module 140 may include at least one of, for example, a broadcasting communication module, an audio reproduction module, or a video reproduction module. The input/output module 160 may include at least one of, for example, a button, a microphone, a speaker, a vibration motor, a connector, a touchscreen, and a keypad.

The storage unit 175 may store signals or data that are input/output to the foldable display apparatus 100 and correspond to operations of the mobile communication unit 120, the sub-communication unit 130, the multimedia module 140, a camera module, a GPS module, the input/output module 160, the storage unit 175, the power supply unit 170, and the display panel 190 under the control of the control unit 110. The storage unit 175 may store control programs and applications used to control the foldable display apparatus 100 or the control unit 110.

The term "storage unit" may refer to the storage unit 175, the ROM 112, the RAM 113, or a memory card mounted in the foldable display apparatus 100. The storage unit 175 may include, for example, a non-volatile memory, a volatile memory, a hard disk drive (HDD), or a solid state drive (SSD).

The power supply unit 170 may supply power to at least one battery arranged in a housing of the foldable display apparatus 100 under the control of the control unit 110. Further, the power supply unit 170 may supply power, which is input from an external power source via a wired cable connected to the connector, to each component of the foldable display apparatus 100.

The display panel 190 may output a user interface corresponding to various services for users. The display panel 190 may include a touch screen. Accordingly, a signal corresponding to at least one touch input by a user may be transmitted to the control unit 110.

The folding information detection unit 180 may detect folding information based on the folded state of the foldable display apparatus 100. The folding information detected from folding information detection unit 180 may be provided to a user, for example, by being displayed on the display panel 190 via the control unit 110, or by being presented to the user via sound or vibration under control of the control unit 110.

Figure 5:
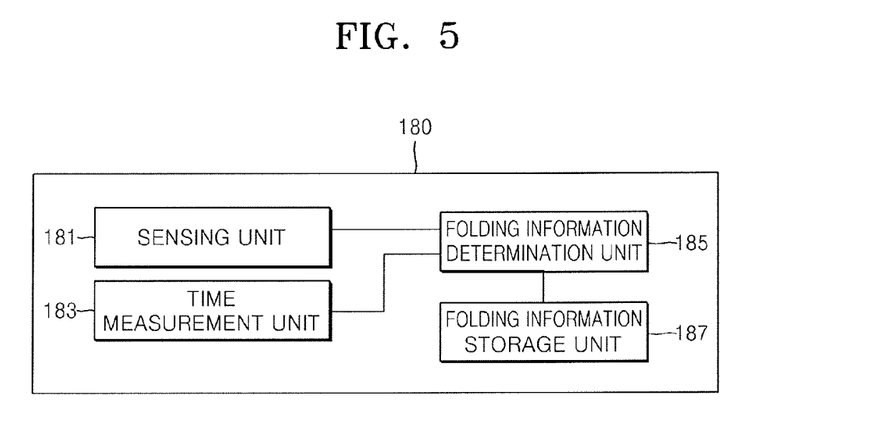
FIG. 5 is a block diagram of the structure of a folding information detection unit, according to an exemplary embodiment of the present invention.

FIG. 5 is a block diagram of the structure of the folding information detection unit 180, according to an exemplary embodiment of the present invention. The folding information detection unit 180 may include, for example, a sensing unit 181 (e.g., a sensing circuit), a time measurement unit 183 (e.g., a time measurement circuit), a folding information determination unit 185 (e.g., a folding information determination circuit), and a folding information storage unit 187 (e.g., a folding information storage circuit).

The sensing unit 181 may determine the folded state and/or the unfolded state of the foldable display apparatus 100 based on the strain values occurring in the folding area in which the foldable display apparatus 100 is folded.

In exemplary embodiments, the sensing unit 181 may determine whether the foldable display apparatus 100 is in a folded state or an unfolded state by receiving an output value from the strain sensor(s) 181a arranged in the folding area. For example, in a case in which the strain value $\epsilon$ of the folding area is in a range of $a^*\epsilon_{ref} \leq \epsilon \leq \epsilon_{max}$ (a is between 0.5 and 1), the foldable display apparatus 100 may be in the front folded state. Alternatively, in a case in which the strain value $\epsilon$ of the folding area is in a range of $-\epsilon_{ref} \leq \epsilon \leq -a^*\epsilon_{max}$ (a is between 0.5 and 1), the foldable display apparatus 100 may be in the back folded state.

In an exemplary embodiment, the sensing unit 181 may determine whether the foldable display apparatus 100 is in a folded state or an unfolded state according to an interference value of pixels in the folding area of the foldable display apparatus 100.

The time measurement unit 183 may measure a folding accumulation time and/or an unfolding accumulation time when the folded state and/or the unfolded state of the foldable display apparatus 100 is maintained. For example, the folding accumulation time indicates an amount of time that the display apparatus 100 has been maintained in a folded state, and the unfolding accumulation time indicates an amount of time that the display apparatus 100 has been maintained in an unfolded state.

The folding information determination unit 185 may determine the folding information based on the folding accumulation time. In exemplary embodiments, the folding information determination unit 185 may add the folding accumulation time when the front folded state of the foldable display apparatus 100 is maintained, or when the back folded state of the foldable display apparatus 100 is maintained. Alternatively, the folding information determination unit 185 may calculate a value by subtracting the unfolding accumulation time from the folding accumulation time. Alternatively, the folding information determination unit 185 may determine the folding information based on a front folded state duration and a back folded state duration. For example, the front folded state duration and the back folded state duration may be separately determined, or an added value or a subtracted value may be calculated.

In exemplary embodiments, the folding information determination unit 185 may determine whether a time when a one-time folded state is maintained reaches a threshold time. For example, a time when the foldable display apparatus 100 is folded in a single state may be compared to a threshold state.

The folding information storage unit 187 stores the folding information determined by the folding information determination unit 185. The folding information that is stored in the folding information storage unit 187 may be displayed on the display panel 190 via the control unit 110. Further, the folding information may be utilized with an audio signal or a vibration signal. For example, when the one-time folded state reaches the threshold time, an alarm may ring or the foldable display apparatus 100 may vibrate.

The foldable display apparatus 100 may be embodied in various forms such as, for example, a mobile device described with reference to FIGS. 4 and 5, a TV, a medical data display apparatus, etc.

Figure 6:
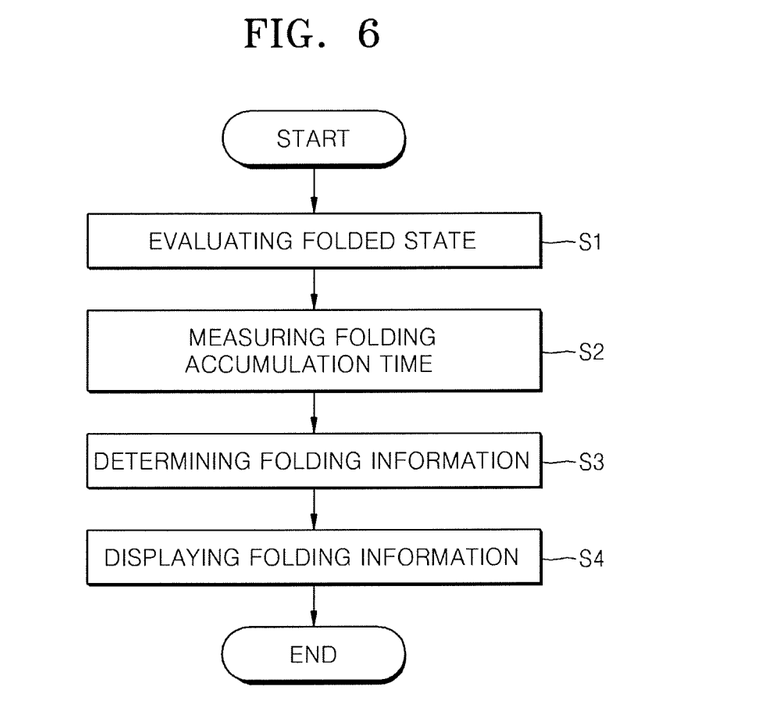
FIG. 6 is a flowchart of a method of displaying folding information corresponding to a foldable display apparatus, according to an exemplary embodiment of the present invention.

FIG. 6 is a flowchart of a method of displaying folding information corresponding to the foldable display apparatus 100, according to an exemplary embodiment of the present invention.

At S1, the folded state of the foldable display apparatus 100 is evaluated. The folded state may be evaluated based on the strain values of the folding area in which the foldable display apparatus 100 is folded. The folded state may include, for example, the front folded state and the back folded state.

At S2, the folding accumulation time indicating an amount of time that the folded state of the foldable display apparatus 100 is maintained is measured. The folding accumulation time may separately reflect the front folding accumulation time and the back folding accumulation time.

At S3, the folding information is determined based on the folding accumulation time. In exemplary embodiments, the folding information may be an accumulation time from an initialization point of the foldable display apparatus 100 to the front folding state.

In exemplary embodiments, the folding information may be determined based on the front folding accumulation time and the back folding accumulation time. For example, the folding information may be a value representing a difference between the front folding accumulation time and the back folding accumulation time.

A method of displaying the folding information may include evaluating the unfolded state of the foldable display apparatus 100, and measuring the unfolding accumulation time when the unfolded state of the foldable display apparatus 100 is maintained.

In exemplary embodiments, the folding information may be the value representing the difference between the front folding accumulation time and the back folding accumulation time.

At S4, the folding information is displayed on the display panel 190. In exemplary embodiments, the folding information may be displayed on the display panel 190 as a number. The displayed number may be colored. For example, in a case in which the folding accumulation time included in the folding information is greater than the unfolding accumulation time, the number may be displayed in red, and in a case in which the unfolding accumulation time is greater than the folding accumulation time, the number may be displayed in green. In exemplary embodiments, rather than displaying folding information at S4, the folding information may be provided to the user in another manner, for example, via sound or vibration.

In an exemplary embodiment, the folding information may be displayed as a bar. In this case, the direction, length, and/or type of the bar may vary with the folding or unfolding accumulation time. The bar may also be colored. For example, in a case in which the folding accumulation time included in the folding information is greater than the unfolding accumulation time, the bar may be colored red, and in a case in which the unfolding accumulation time is greater than the folding accumulation time, the bar may be colored green.

Figure 7A:
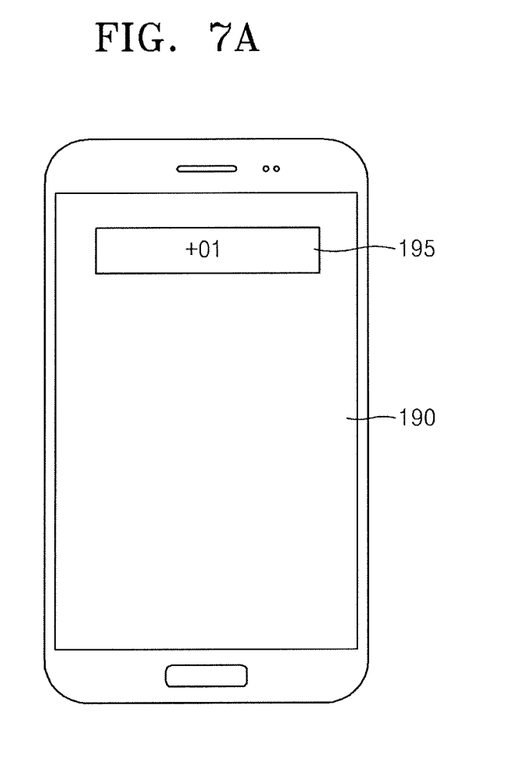
FIGS. 7A and 7B show examples of displaying folding information on display panels, according to exemplary embodiments of the present invention.
Figure 7B:
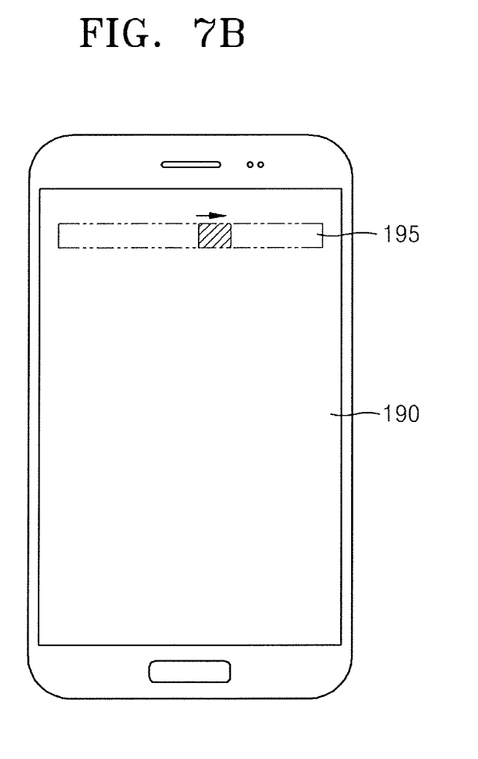

FIGS. 7A and 7B show examples of displaying the folding information on the display panel 190, according to exemplary embodiments of the present invention.

Referring to FIGS. 7A and 7B, the display panel 190 includes a folding information display unit 195. The folding information display unit 195 may be a dedicated display unit disposed anywhere on the foldable display apparatus 100, or part of the display area of the display panel 190. When the folding information display unit 195 is part of the display area of the display panel 190, the folding information display unit 195 may be enabled and disabled. In FIG. 7A, the folding information display unit 195 utilizes a numbering system. For example, an initial point of the foldable display apparatus 100 may be displayed as "00" on the folding information display unit 195. A value of the folding information obtained by subtracting the unfolding accumulation time from the folding accumulation time may be displayed by the folding information display unit 195. For example, the folding information display unit 195 may display the folding accumulation time as "+01", "+02", "−01", "−02", etc. In this case, "+" means that the folding accumulation time is greater than the unfolding accumulation time, and "−" means that the unfolding accumulation time is greater than the folding accumulation time. The sign "+" may be displayed in red, and the sign "−" may be displayed in green.

Referring to FIG. 7B, the folding information display unit 195 has a bar form. When the folding information is a positive number, the folding information may be indicated by the bar extending toward the right from a center portion. When the folding information is a negative number, the folding information may be indicated by the bar extending toward the left from the center portion. The folding information may be further indicated using colors by coloring the right portion in red, the left portion in green, etc.

It is to be understood that the manner in which the folding information is presented to a user is not limited to the exemplary embodiments described herein. For example, the folding information may be indicated to the user using any number of indicators perceptible to the user. For example, various shapes, colors, numbering schemes, images, etc. may be used to visually display the folding information. Further, the folding information may be indicated via an audio signal or a vibration signal.

As described above, according exemplary embodiments of the present invention, a foldable display apparatus 100 may display folding information. The foldable display apparatus 100 may provide a user with the folding information displayed on a foldable display panel 190, and thus, strain information regarding the foldable display apparatus 100 may be provided to the user. Thus, the user may manipulate the foldable display apparatus 100 to release strain.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A method of displaying folding information, comprising:
    evaluating a folded state of a foldable display apparatus;
    measuring a folding accumulation time that indicates an amount of time that the folded state is maintained;
    determining the folding information based on the folding accumulation time; and
    displaying the folding information on a display panel of the foldable display apparatus,
    wherein the folding information indicates the amount of time that the folded state is maintained.

2. The method of claim 1, wherein evaluating the folded state is based on a strain value measured in a folding area at which the foldable display apparatus is folded.

3. The method of claim 1, further comprising:
    evaluating an unfolded state of the foldable display apparatus; and
    measuring an unfolding accumulation time that indicates an amount of time that the unfolded state is maintained,
    wherein the folding information is determined based on the folding accumulation time and the unfolding accumulation time.

4. The method of claim 3, wherein the folding information indicates a value obtained by subtracting the unfolding accumulation time from the folding accumulation time.

5. The method of claim 1, wherein the folding information is indicated by at least one of a number, a color, and a bar length.

6. The method of claim 1, wherein the folded state comprises a front folded state or a back folded state,
    wherein the folding accumulation time is classified into a front folding accumulation time and a back folding accumulation time according to the folded state,
    wherein the folding information is determined based on the front folded accumulation time and the back folded accumulation time,
    wherein the front folded state corresponds to the foldable display apparatus being folded in a first direction, and the back folded state corresponds to the foldable display apparatus being folded in a second direction, opposite the first direction.

7. The method of claim 1, wherein a portion of the display panel of the foldable display apparatus is folded.

8. A foldable display apparatus, comprising:
    a display panel comprising a folding area at which the display panel is folded;
    a sensing unit configured to determine a folded state of the display panel;
    a time measurement unit configured to measure a folding accumulation time that indicates an amount of time that the folded state is maintained;
    a folding information determination unit configured to determine folding information based on the folding accumulation time;
    a storage unit configured to store the folding information; and
    a folding information display unit configured to display the folding information,
    wherein the folding information indicates the amount of time that the folded state is maintained.

9. The foldable display apparatus of claim 8, wherein the sensing unit comprises at least one strain sensor,
    wherein the at least one strain sensor is located in the folding area, and is configured to determine whether the foldable display apparatus is in the folded state based on a strain value measured in the folding area.

10. The foldable display apparatus of claim 9, wherein the folded state is determined based on an average of a plurality of strain values measured in the folding area by the at least one strain sensor.

11. The foldable display apparatus of claim 8, wherein the time measurement unit is configured to measure an unfolding accumulation time that indicates an amount of time that an unfolded state of the display panel is maintained,
wherein the folding information is determined based on the folding accumulation time and the unfolding accumulation time.

12. The foldable display apparatus of claim 11, wherein the folding information indicates a value obtained by subtracting the unfolding accumulation time from the folding accumulation time.

13. The foldable display apparatus of claim 8, wherein the folding information is indicated by at least one of a number, a color, and a bar length.

14. The foldable display apparatus of claim 8, wherein the folded state comprises a front folded state or a back folded state,
wherein the folding accumulation time is classified into a front folding accumulation time and a back folding accumulation time according to the folded state,
wherein the folding information is determined based on the front folding accumulation time and the back folding accumulation time,
wherein the front folded state corresponds to the foldable display apparatus being folded in a first direction, and the back folded state corresponds to the foldable display apparatus being folded in a second direction, opposite the first direction.

15. A method of providing folding information, comprising:
evaluating a folded state of a foldable display apparatus, wherein the folded state is a state in which a display panel of the foldable display apparatus is not substantially flat;
measuring a folding accumulation time that indicates an amount of time that the folded state is maintained;
determining the folding information based on the folding accumulation time; and
providing the folding information to a user,
wherein the folding information indicates the amount of time that the folded state is maintained.

16. The method of claim 15, wherein the folding information is provided to the user via a visual indication.

17. The method of claim 15, wherein the folding information is provided to the user via an audible indication.

18. The method of claim 15, wherein the folding information is provided to the user via a vibratory indication.

19. The method of claim 15, further comprising:
evaluating an unfolded state of the foldable display apparatus, wherein the unfolded state is a state in which the display panel of the foldable display apparatus is substantially flat; and
measuring an unfolding accumulation time that indicates an amount of time that the unfolded state is maintained,
wherein the folding information is determined based on the folding accumulation time and the unfolding accumulation time, and evaluating the folded state is based on a strain value measured in a folding area at which the display panel is folded.

* * * * *